VERTICAL DEFLECTION ARRANGEMENT
Filed June 29, 1962
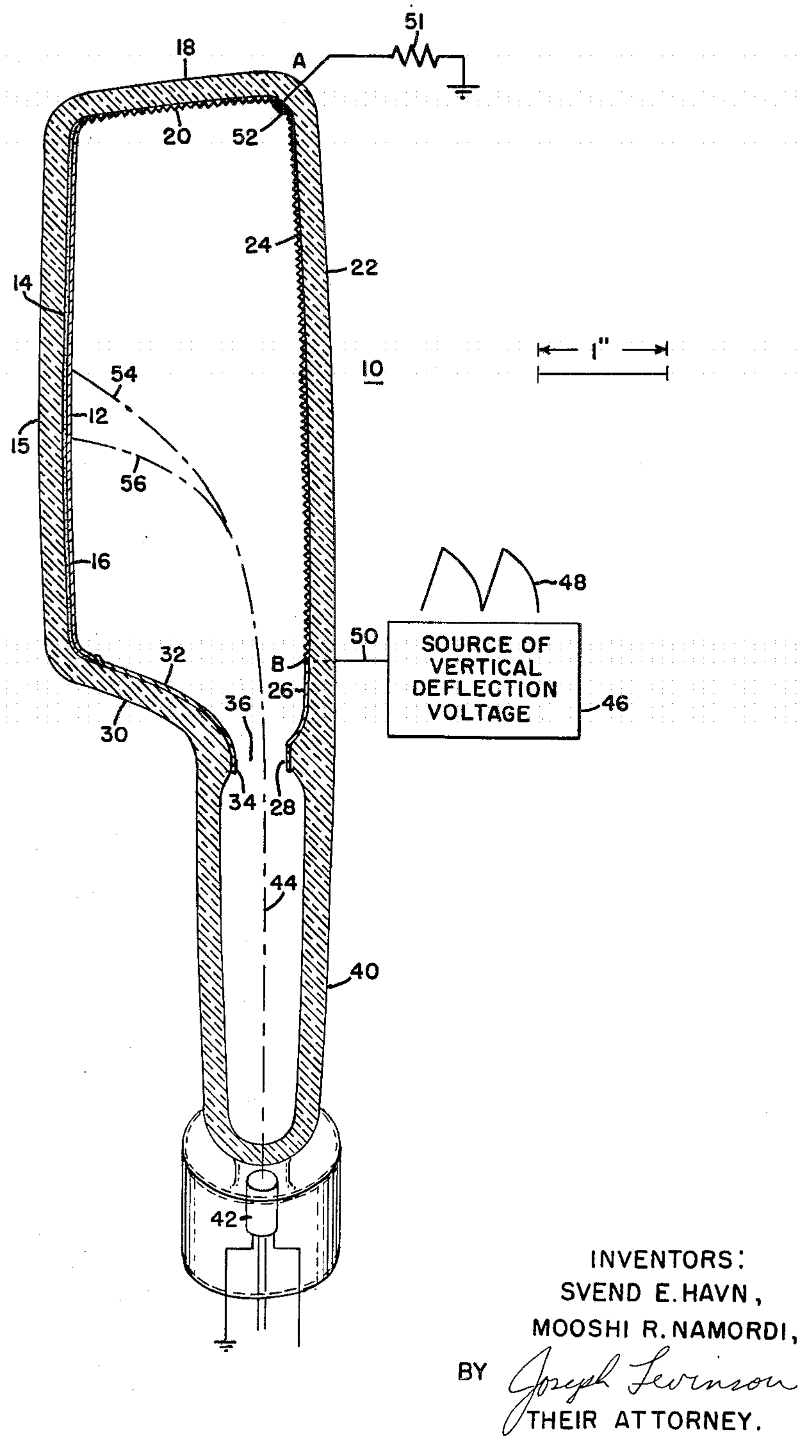
INVENTORS:
SVEND E. HAVN,
MOOSHI R. NAMORDI,
BY Joseph Levinson
THEIR ATTORNEY.

United States Patent Office 3,118,084
Patented Jan. 14, 1964

3,118,084

VERTICAL DEFLECTION ARRANGEMENT

Svend E. Havn, Liverpool, and Mooshi R. Namordi, Syracuse, N.Y., assignors to General Electric Company, a corporation of New York Filed June 29, 1962, Ser. No. 206,240
2 Claims. (Cl. 315—18)

This invention relates to an image display system and more particularly to a vertical deflection arrangement for a relatively shallow cathode ray picture tube utilized in such a system.

An image display system of the type to which this invention pertains is shown and described in an application Serial No. 141,862, which is assigned to the assignee of the present invention. In such a system a shallow cathode ray tube is employed having a target area positioned on the front or viewing area of the tube and a vertical deflection section is spaced from the target area on the inside of the opposite wall of the picture tube. Suitable operating potentials are applied to the target area and to the deflection means for providing a potential gradient therebetween such that when an electron beam is directed into the space which separates the target area and the deflection means, the beam is deflected from top to bottom in a vertical direction. In accomplishing this objective, the deflection means is provided with a gradient means along at least an upper portion thereof to which a variable deflection voltage wave source is applied at a lower extremity thereof while the other or upper extremity thereof is maintained at some fixed potential by the application of a source of fixed potential thereto. Although this system operates quite satisfactorily, it would also be advantageous to improve vertical sensitivity by lowering the amount of vertical deflection voltage which is applied to the deflection means, and it would be highly advantageous to eliminate the need for a fixed potential which is applied to the upper extremity of the gradient means.

Accordingly, it is an object of this invention to provide a vertical deflection arrangement for a shallow cathode ray tube system in which a gain of sensitivity is realized over the system described in the aforesaid application.

A further object of this invention is to provide an improved vertical deflection arrangement for shallow cathode ray tube systems which eliminates the need for one of the fixed potentials required in a similar system described in the aforesaid application.

Another object of this invention is to provide a novel vertical deflection arrangement for a shallow cathode ray tube which is more economical than the arrangement employed in the aforesaid application.

In carrying out this invention in one illustrative embodiment thereof, a shallow cathode ray tube is provided having a target area on one surface thereof and a deflection means spaced opposite said target on another surface thereof which when energized establishes a deflection field opposite the target. One extremity of the deflection means is maintained at a varying potential in accordance with an applied deflection voltage and another extremity thereof is established at a continuously varying potential having a waveform of smaller amplitude than said applied deflection voltage but which is related to the applied deflection voltage to establish an electrostatic field such that an electron beam when projected into said field is caused to scan the target from top to bottom by the deflection means.

The invention, both as to organization and method of operation, together with further objects and advantages thereof, may best be understood by reference to the following description taken in connection with the accompanying drawing.

The drawing is a cross-sectional, side elevational view of the shallow cathode ray tube employing the new and improved vertical deflection arrangement in accordance with this invention.

Since this invention is directed to a vertical deflection arrangement for a shallow cathode ray tube, all reference to means for providing horizontal deflection and the circuitry therefor are not shown in the drawing nor described herein. Although various types of horizontal deflection arrangements and structures may be used, the horizontal deflection structure disclosed in an application Serial No. 141,863, which is assigned to the assignee of the present invention, is preferred. The basic requirement of the horizontal deflection arrangement with respect to the present invention is to provide a collimated beam of electrons which scans back and forth as the beam enters the vertical deflection fields which will be described subsequently herein.

Referring now to the drawing, a shallow cathode ray tube 10 is shown having a target area 12 disposed on the inside of the front portion or viewing area 15 of the tube. The target area 12 is comprised of a phosphor layer 14 deposited on the inside of the front wall 15 of the glass envelope and an electron permeable metallic coating 16, such as aluminum, is superimposed on the phosphor coating 14. An upper wall 18 of the cathode ray tube 10, which represents the depth dimension of the tube, has a highly resistive coating 20 deposited thereon which is electrically connected to the top of the conductive metallic coating 16. The resistive coating or resistive means referred to relates to a means having a resistance of sufficient magnitude to prevent loading by drawing appreciable current from the applied voltage sources. A back wall 22 of the cathode ray tube 10 has a highly resistive coating 24, which is electrically connected at its upper extremity via the conductor 52 to the resistive coating 20 and is also electrically connected to the conductive coating 26 which extends along the lower portion of the back wall 22. The section 30 which extends from the front wall 15 forms a constricted throat area 36 with the back wall 22. The section 30 has a conductive coating 32 thereon which is an extension of the conductive coating 16 on the front wall 15. The conductive coating 32 terminates in a strip 34 which lines one side of the constricted throat area 36. The other side of the constricted throat area 36 is lined by a strip 28 which is an extension of the conductive coating 26. The lower or funnel section 40 of the cathode ray tube 10 has an electron gun 42 mounted thereon for providing a suitable beam of electrons 44. The funnel section 40 also includes suitable horizontal deflection means which is not shown herein for purposes of simplicity but which is preferably of the type shown and described in the application Serial No. 141,863, which was previously referred to.

In order to provide electric fields for the necessary vertical deflection, a positive fixed high voltage is applied to the conductive coatings 16, 32 and 34 by any suitable means such as a wire extending through the glass envelope to the conductive coatings. A source of vertical deflection voltage 46 having a suitable wave shape 48 is applied via a conductor 50 which is connected to the lower extremity of resistive coating 24. Since a constant potential is applied to the conductive coatings on the front wall 15 and on section 30 and a varying potential is applied to the coatings on the back wall 22, a varying electrostatic field is formed between the coatings on the front wall and the back wall. Accordingly, an electron beam directed by the electron gun 42 into this field causes the beam 44 to scan the target 12 in a vertical direction.

The aforesaid structure together with variations and ramifications thereof is all shown and described in the aforesaid application Serial No. 141,862. This invention provides a departure therefrom by providing a resistor 51 which is connected between the conductor 52, which joins the resistive coating 20 on the top portion 18 and the resistive coating 24 on the back wall 22 along the upper edges thereof, and ground. The effect of the resistor 51 is to cause a voltage division between the resistance of the resistor 51 and the resistance of the coating 24. Thus, a portion of the deflection voltage supplied from the source 46 is divided in accordance with the proportioning of the resistance of the gradient means 24 and the resistance of resistor 51.

Effectively then, when the resistance of resistor 51 is increased the voltage at point A to which the resistor is connected is increased while a reduction in the resistance of resistor 51 with respect to the resistance of the gradient means 24 effectively reduces the potential at point A on the cathode ray tube 10. Increasing the resistance of resistor 51, increases the voltage at point A with a resultant increase in sensitivity as will be explained hereinafter. However, if the voltage at point A is too high due to an increase in the resistance of resistor 51, the focus is degraded because of the shallower path which the beam 44 follows in striking the target. The greater the potential at point A, the greater the angle the beam 44 strikes the target with respect to the normal of the target. Conversely, as the voltage at point A is reduced, the angle which the beam strikes the target is closer to the normal of the target area with an improvement in focus. It should be noted that the resistive coating 24 is shown extended over a greater portion of the back wall 22 of the tube than was the case in application Serial No. 141,862. This is provided in that the effect of the varying potential at point A is more pronounced when the resistive coating is extended over a greater portion of the back wall 22 of the tube.

To more clearly explain the manner in which the vertical deflection is achieved by usilizing the grounded resistor 51 which is connected to point A at the upper extremity of the back wall 22 of the tube 10, three specific examples will be illustrated. In the first illustration assume that the voltage at point A equals 3 kilovolts, the voltage on the target area 12 equals 10 kilovolts, and the voltage applied to the other extremity of the gradient means equals 8 kilovolts when the beam impinges on the top of the target area 12. For this example, the voltage at point A is not changed during a scanning cycle while the voltage at point B is constantly changing in accordance with the applied input wave 48 from the source of vertical deflection voltage 46. At a time later in the scan period when the voltage at B equals 3 kilovolts, the entire rear gradient means 24 is then at a potential of 3 kilovolts. The electrostatic field between the target 12 and the gradient means 24 then provide a constant force field perpendicular to the target area and the path of the beam 44 is a parabola, when neglecting the predeflection in the constricted throat area 36. Under such circumstances the beam 44 impinges upon the target area 12 at a rather large angle to the normal of the target area which is illustrated on the drawing by the dotted line 54. The greater this angle, the poorer the focus and therefore the focus is not as good in such a case as could be desired. Now compare the above example to the second example, where point A is connected to ground through the resistor 51. Now assume that the resistance value of the resistor 51 is such that the potential at A is 3 kilovolts when the potential at B equals 8 kilovolts. Thus, the electron beam 44 impinges on the top of the target area 12 traversing the same trajectory as in the previous example. For this particular path the focus action on the beam 44 and the required voltage at B is unchanged from the previous example. However, later in the scan period when the voltage B equals 3 kilovolts, the potential at A developed through the voltage division between the gradient means 24 and the resistor 51 is now less than 3 kilovolts, for example 500 volts. In this case, again neglecting the deflection taking place in the constricted throat area 36, the force from the field acting upon the beam 44 now increases along the path of the beam. The angle at which the beam approaches the screen when measured to the normal of the screen is therefore smaller which results in improved focus at the central region of the target area 12. This is illustrated by the dotted line 56 in the drawing. At the same time a slight gain in vertical sensitivity is attained but only in the latter portion of the scan period because the potential at B is now higher at the end of the scan period than in the case in which A was held at a constant potential.

In order to experience a worthwhile gain in vertical sensitivity at the beginning of the scan period, the beam 44 must impinge upon the top of the target area 12 for aa potential at B which is lower than 8 kilovolts when assuming the same conditions as in the two previous examples. To accomplish this result, the amount of resistance of resistor 51 is increased. In so doing the potential at point A will be greater than 3 kilovolts when the potential at B is 8 kilovolts and the point at which the beam 44 impinges upon the target 12 moves upward. Therefore, the potential at B must be reduced if the beam 44 again is to impinge upon the target 12 at the very top thereof. However, the minimum potential at B as required when the beam is to hit the very bottom of the target area is not changed noticeably. By reducing the peak amplitude of the voltage at B, a gain in sensitivity is realized. It should be noted, however, that the focus quality at the central region of the target area 12 is still improved but not as greatly as in the second cited example. Furthermore, the beam 44 in the third example now impinges at the top of the target area 12 at a greater angle than in the case where point A was held at a constant potential. This is a compromise which is necessary in order to provide improvement in vertical sensitivity.

The extra sensitivity which can be achieved by the present invention could be an important factor for transistorized television receivers. Since less vertical drive is required, cheaper vertical sweep circuitry may be employed. A more economical set is also provided due to the elimination of one of the fixed potentials which was previously required at point A. The degradation of focus quality due to these changes is so small and imperceptible that they hardly detract from the desirous results which are achieved.

Since other modifications varied to fit the particular operating requirements and environments will be apparent to those skilled in the art, the invention is not considered limited to the examples chosen for purposes of disclosure and covers all modifications and changes which do not constitute departures from the true spirit and scope of this invention.

What we claim as new and desire to secure by Letters Patent of the United States is:

1. In an image display device, a target area capable of producing an image when scanned by a beam of electrons, means for applying a potential to said target, deflection means spaced opposite and extending along said target capable of providing scansion of a beam of electrons over an area of said target, said deflection means including gradient means for establishing a potential gradient along at least a portion of said deflection means, means for applying a variable deflection voltage wave to said deflection means which establishes one extremity of said gradient means at a varying potential in accordance with said deflection voltage wave, and means for establishing the other extremity of said gradient means at a continuously varying potential of a waveform having a smaller magnitude and being proportional to that of said deflection voltage wave.

2. The structure set forth in claim 1, wherein said means for establishing the other extremity of said gradient means at a continuously varying potential comprises a resistance connected between said gradient means and a point of common reference potential.

References Cited in the file of this patent

UNITED STATES PATENTS 2,880,365 Law ------------------ Mar. 31, 1959